United States Patent
Brown et al.

(10) Patent No.: US 10,387,257 B1
(45) Date of Patent: Aug. 20, 2019

(54) SYSTEMS AND METHODS FOR RELIABLE REDUNDANT MANAGEMENT CONTROLLER FIRMWARE UPDATE

(71) Applicant: Dell Products L.P., Round Rock, TX (US)

(72) Inventors: Michael E. Brown, Austin, TX (US); Senthil Kumar, Bangalore (IN); Marshal F. Savage, Austin, TX (US); Ashok N. Potti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/050,643

(22) Filed: Jul. 31, 2018

(51) Int. Cl.
*G06F 9/445* (2018.01)
*G06F 11/14* (2006.01)
*G06F 11/07* (2006.01)
*G06F 8/65* (2018.01)
*G06F 9/4401* (2018.01)
*H04L 29/08* (2006.01)
*G06F 11/20* (2006.01)

(52) U.S. Cl.
CPC ........... *G06F 11/1433* (2013.01); *G06F 8/65* (2013.01); *G06F 9/4401* (2013.01); *G06F 11/0793* (2013.01); *G06F 11/1417* (2013.01); *G06F 11/2041* (2013.01); *H04L 67/34* (2013.01)

(58) Field of Classification Search
USPC .................................................. 717/172, 177
See application file for complete search history.

(56) References Cited

U.S. PATENT DOCUMENTS 8,601,170 B1 * 12/2013 Marr ..................... G06F 21/572
710/15
2016/0019050 A1 * 1/2016 Marr ..................... G06F 21/572
717/172

* cited by examiner

*Primary Examiner* — Chuck O Kendall
(74) *Attorney, Agent, or Firm* — Jackson Walker L.L.P.

(57) ABSTRACT

A firmware update of multiple processing nodes in an information handling system may include writing updated firmware images to reserve memory partitions associated with each node, rolling all nodes back to the existing firmware images if writing of an updated firmware image fails, booting each node into the updated firmware image stored on its associated reserve memory partition if writing of updated firmware images succeeds, booting each node into the updated firmware image stored on its associated reserve memory partition, rolling all nodes back to the existing firmware images if booting of an updated firmware image fails, copying the updated firmware images from reserve memory partitions associated with each node to the respective working memory partition associated with each node if booting of updated firmware images succeeds.

24 Claims, 4 Drawing Sheets

SYSTEMS AND METHODS FOR RELIABLE REDUNDANT MANAGEMENT CONTROLLER FIRMWARE UPDATE

TECHNICAL FIELD

The present disclosure relates in general to information handling systems, and more particularly to methods and systems for reliable redundant management controller firmware updates in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a management controller for providing out-of-band management facilities for management of the information handling system. Such management may be made by the management controller even if the information handling system is powered off or powered to a standby state, as a management controller may include an out-of-band network interface separate from and physically isolated from an in-band network interface of the information handling system. Such management controllers may include or may be an integral part of a baseboard management controller (BMC), a remote access controller (e.g., a Dell Remote Access Controller of Integrated Dell Remote Access Controller), an enclosure controller, or a chassis management controller (CMC).

In next generation management controllers, a management controller may include two complete and independent processors, each processor with its own completely independent firmware. For example, one processor on a management controller may be an "enclosure controller" and another processor on the management controller may be a "management services module." Accordingly, in an information handling system with two management controllers, each management controller with two independent processors executing independent firmware, a full firmware update of the management controllers may require updating firmware for at least four independent processors. Ideally, it is desirable that the firmware update process be as reliable as possible, avoiding any states in which the firmware running on a management controller is mismatched between the two processors of the management controller, as well as ensuring the firmware between redundant management controllers is in synchronization.

SUMMARY

In accordance with the teachings of the present disclosure, the disadvantages and problems associated with existing approaches to updating firmware in a management controller of an information handling system may be reduced or eliminated.

In accordance with embodiments of the present disclosure, an information handling system may include a first processor, a second processor, a first co-processor, and a second co-processor. The first processor, the second processor, the first co-processor, and the second co-processor are configured to, alone or in concert, perform a firmware update for the first processor, the second processor, the first co-processor, and the second co-processor by writing an updated processor firmware image to a reserve memory partition associated with the first processor while the first processor is executing an existing processor firmware image stored in a working memory partition associated with the first processor, writing the updated processor firmware image to a reserve memory partition associated with the second processor while the second processor is executing the existing processor firmware image stored in a working memory partition associated with the second processor, writing an updated co-processor firmware image to a reserve memory partition associated with the first co-processor while the first co-processor is executing an existing co-processor firmware image stored in a working memory partition associated with the first co-processor, writing the updated co-processor firmware image to a reserve memory partition associated with the second co-processor while the second co-processor is executing the existing co-processor firmware image stored in a working memory partition associated with the second co-processor, causing the first processor to boot from the updated processor firmware image stored to the reserve memory partition associated with the first processor, causing the second processor to boot from the updated processor firmware image stored to the reserve memory partition associated with the second processor, causing the first co-processor to boot from the updated co-processor firmware image stored to the reserve memory partition associated with the first co-processor, and causing the second co-processor to boot from the updated co-processor firmware image stored to the reserve memory partition associated with the second co-processor.

In accordance with these and other embodiments of the present disclosure, a method may include, in an information handling system comprising a first processor, a second processor, a first co-processor, and a second co-processor, performing a firmware update for the first processor, the second processor, the first co-processor, and the second co-processor by writing an updated processor firmware image to a reserve memory partition associated with the first processor while the first processor is executing an existing processor firmware image stored in a working memory partition associated with the first processor, writing the updated processor firmware image to a reserve memory partition associated with the second processor while the second processor is executing the existing processor firmware image stored in a working memory partition associated with the second processor, writing an updated co-processor firmware image to a reserve memory partition associated with the first co-processor while the first co-processor is executing an existing co-processor firmware image stored in a working memory partition associated with the first co-processor, writing the updated co-processor firmware image to a reserve memory partition associated with the second co-processor while the second co-processor is executing the existing co-processor firmware image stored in a working memory partition associated with the second co-processor, causing the first processor to boot from the updated processor firmware image stored to the reserve memory partition associated with the first processor, causing the second processor to boot from the updated processor firmware image stored to the reserve memory partition associated with the second processor, causing the first co-processor to boot from the updated co-processor firmware image stored to the reserve memory partition associated with the first co-processor, and causing the second co-processor to boot from the updated co-processor firmware image stored to the reserve memory partition associated with the second co-processor.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a first processor, a second processor, a first co-processor, and a second co-processor, perform a firmware update for the first processor, the second processor, the first co-processor, and the second co-processor by writing an updated processor firmware image to a reserve memory partition associated with the first processor while the first processor is executing an existing processor firmware image stored in a working memory partition associated with the first processor, writing the updated processor firmware image to a reserve memory partition associated with the second processor while the second processor is executing the existing processor firmware image stored in a working memory partition associated with the second processor, writing an updated co-processor firmware image to a reserve memory partition associated with the first co-processor while the first co-processor is executing an existing co-processor firmware image stored in a working memory partition associated with the first co-processor, writing the updated co-processor firmware image to a reserve memory partition associated with the second co-processor while the second co-processor is executing the existing co-processor firmware image stored in a working memory partition associated with the second co-processor, causing the first processor to boot from the updated processor firmware image stored to the reserve memory partition associated with the first processor, causing the second processor to boot from the updated processor firmware image stored to the reserve memory partition associated with the second processor, causing the first co-processor to boot from the updated co-processor firmware image stored to the reserve memory partition associated with the first co-processor, and causing the second co-processor to boot from the updated co-processor firmware image stored to the reserve memory partition associated with the second co-processor.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
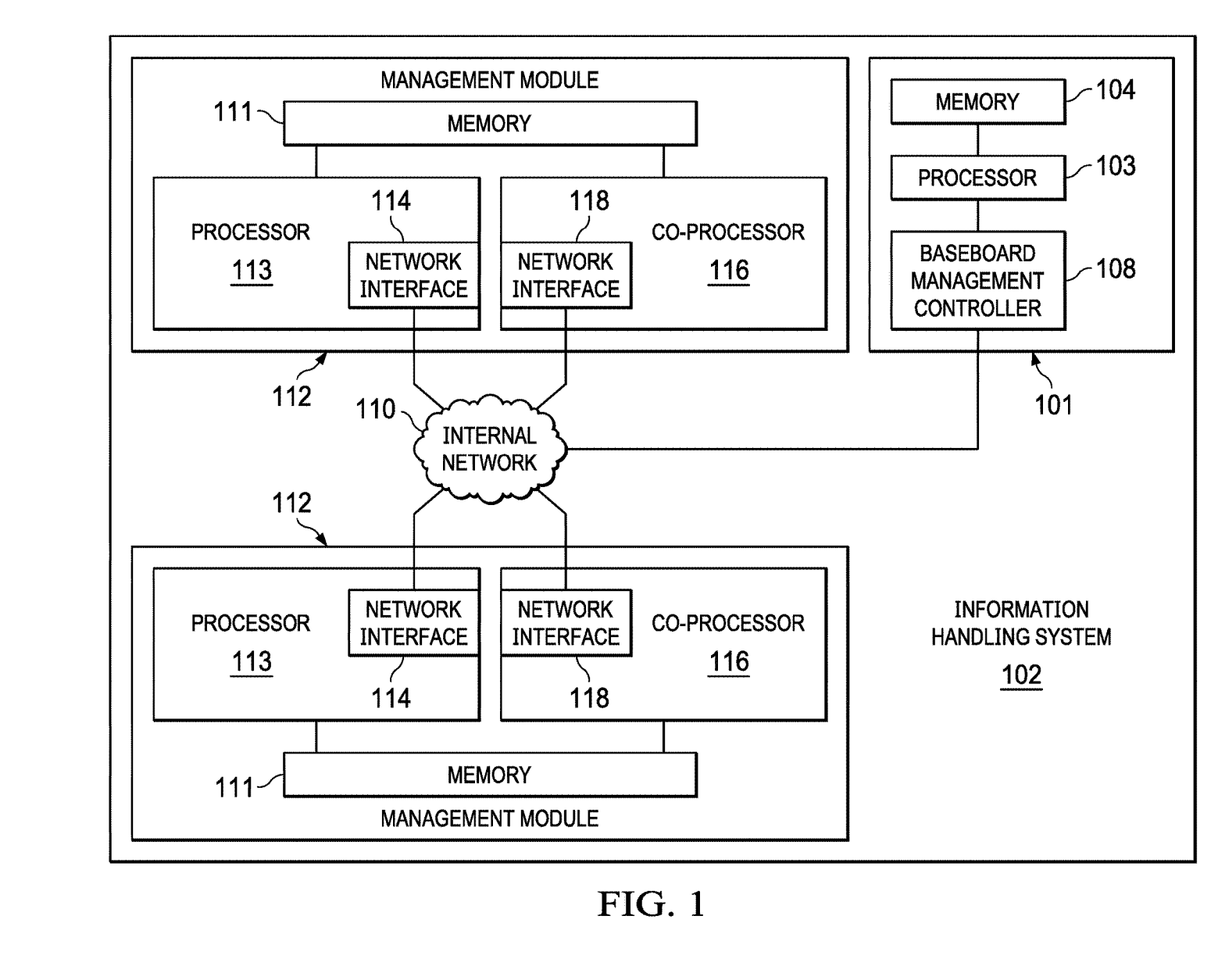
FIG. 1 illustrates a block diagram of an example information handling system, in accordance with embodiments of the present disclosure.
Figure 2A:
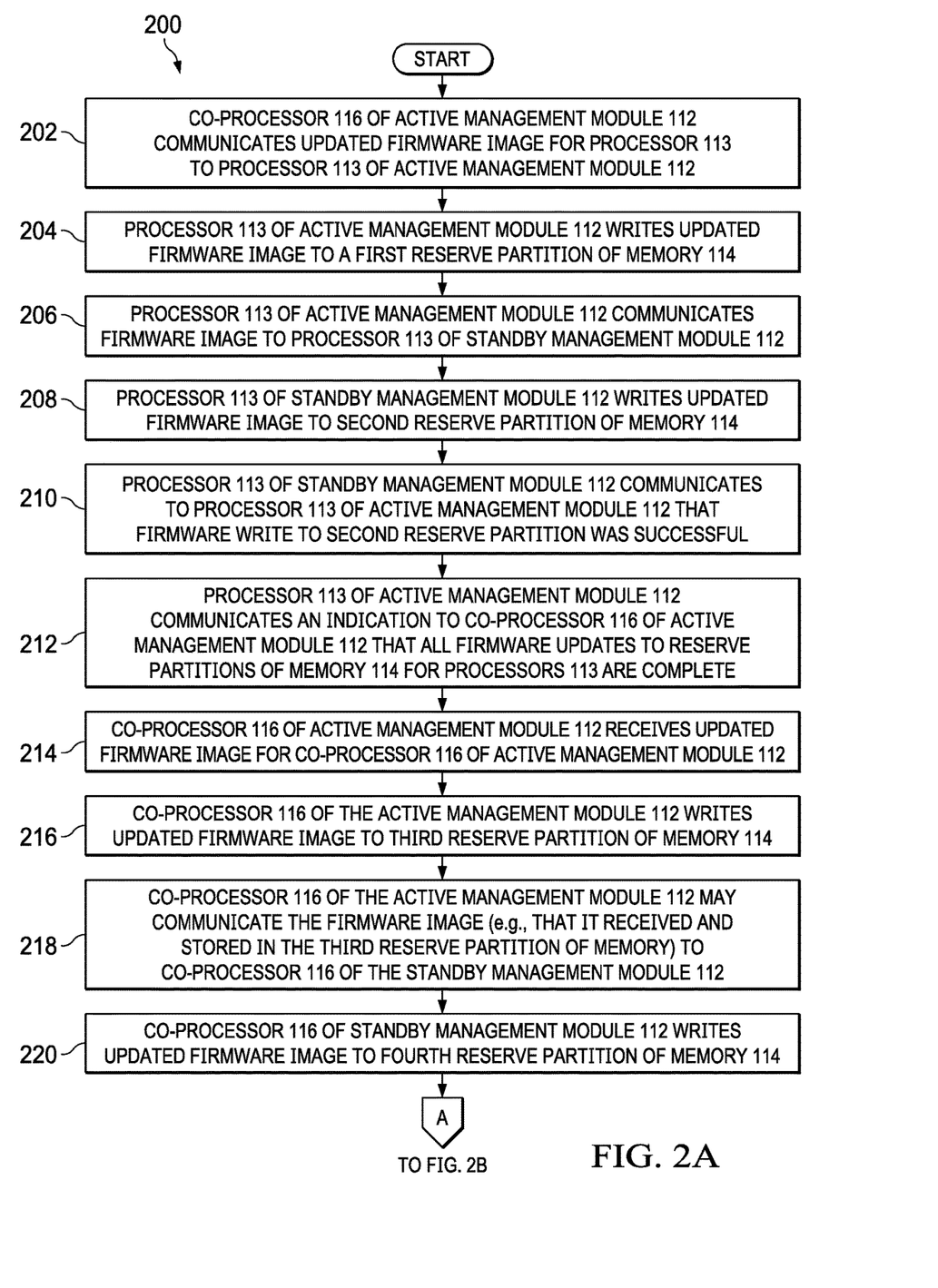
FIGS. 2A-2C illustrate a flow chart of an example method for reliable firmware update of redundant management controllers in an information handling system, in accordance with embodiments of the present disclosure.
Figure 2B:
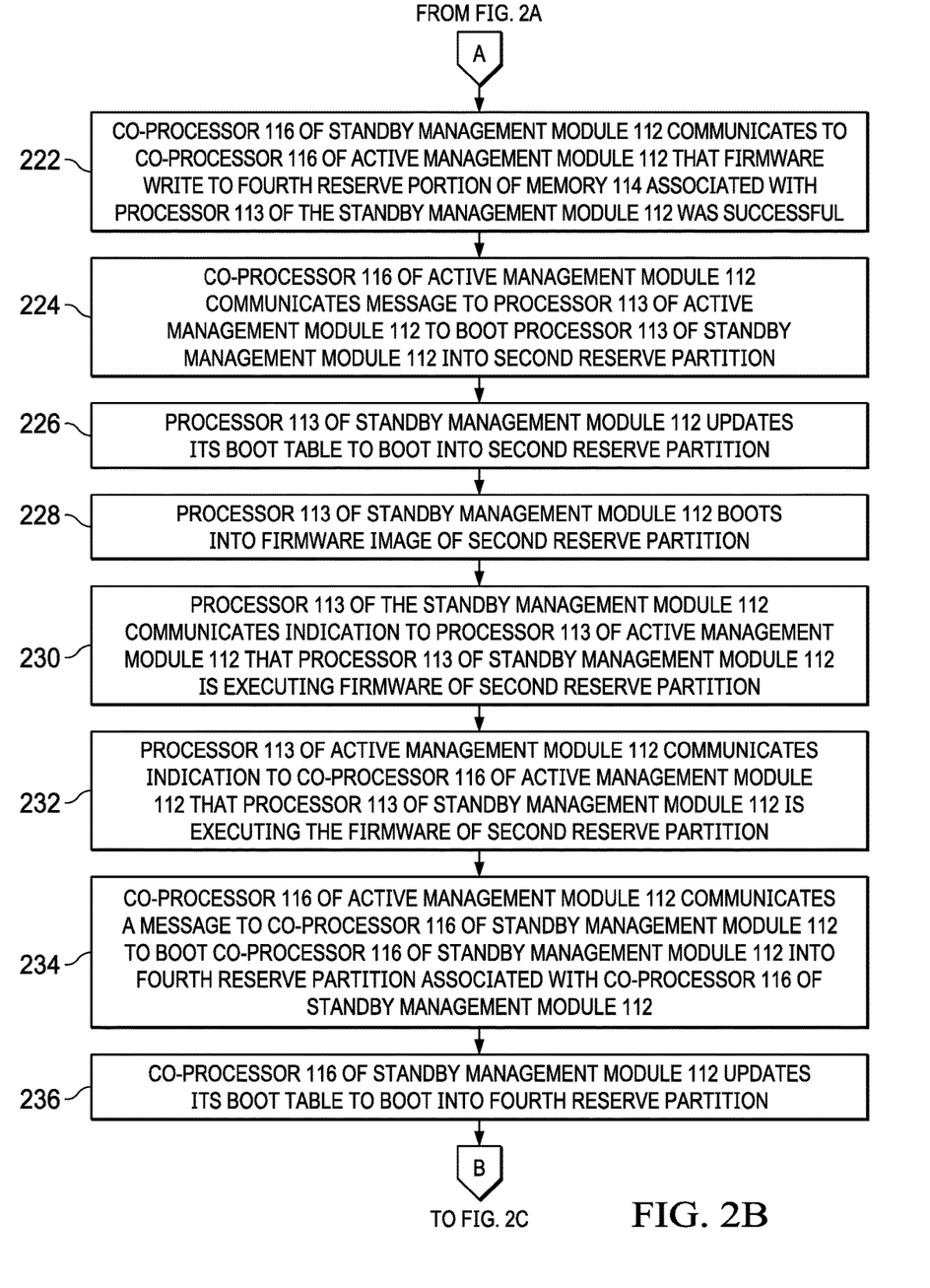
Figure 2C:
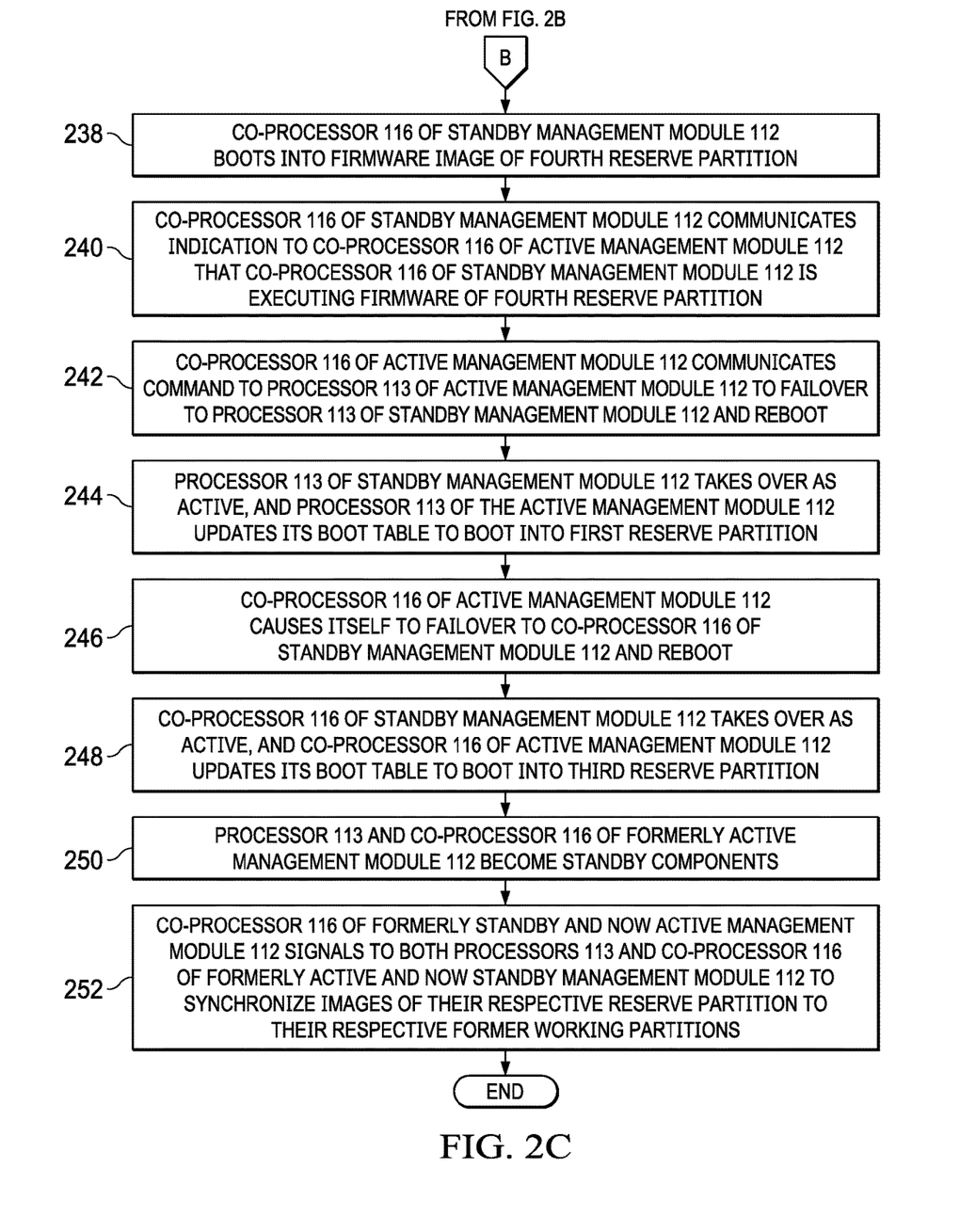

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may be a personal computer. In some embodiments, information handling system 102 may comprise or be an integral part of a server. In other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a baseboard management controller 108 communicatively coupled to processor 103, an internal network 110, and a plurality of redundant management modules 112 communicatively coupled to processor 103 via internal network 110 and baseboard management controller 108.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

A baseboard management controller 108 may be configured to provide out-of-band management facilities for management of information handling system 102. Such management may be made by baseboard management controller 108 even if information handling system 102 is powered off or powered to a standby state. In certain embodiments, baseboard management controller 108 may include or may be an integral part of a remote access controller (e.g., a Dell Remote Access Controller of Integrated Dell Remote Access Controller).

In some embodiments, processor 103, memory 104, and baseboard management controller 108 may reside on a single server blade 101. Although, for the purposes of clarity and exposition, FIG. 1 depicts only a single blade 101 within information handling system 102, it is understood that information handling system 102 may comprise any suitable number of blades 101.

A management module 112 may be configured to provide out-of-band management facilities for management of shared chassis infrastructure of an information handling system 102, such as air movers, power supplies, and/or other components shared by a plurality of blades 101. Such management may be made by management module 112 even if information handling system 102 is powered off or powered to a standby state. Management module 112 may include a processor 113, a co-processor 116, and one or more memories 111. In certain embodiments, management module 112 may include or may be an integral part of an enclosure controller. In other embodiments, management module 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions (e.g., firmware) and/or process data stored in memory 111 and/or another component of information handling system 102 or management module 112. In some embodiments, processor 113 may comprise an enclosure controller configured to execute firmware relating to functionality as an enclosure controller. As shown in FIG. 1, processor 113 may include a network interface 114 for communicating with an internal network 110 of information handling system 102.

Co-processor 116 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, co-processor 116 may comprise a specialized and/or limited function processor capable of undertaking specific functionality for management module 112. In some embodiments, co-processor 116 may comprise a management services module configured to execute firmware relating to functionality as a management services module. As shown in FIG. 1, processor 116 may include a network interface 118 for communicating with an internal network 110 of information handling system 102.

Memory 111 may be communicatively coupled to processor 113 and may include any system, device, or apparatus configured to retain program instructions and/or data for a period of time (e.g., computer-readable media). Memory 111 may include RAM, EEPROM, a PCMCIA card, flash memory, magnetic storage, opto-magnetic storage, or any suitable selection and/or array of volatile or non-volatile memory that retains data after power to management module 112 is turned off.

In particular embodiments, processor 113 and co-processor 116 may perform different and independent functionality of management module 112, and thus, processor 113 may execute firmware different from and independent from firmware executed by co-processor 116.

Network 110 may comprise any suitable system, apparatus, or device operable to serve as communication infrastructure for network interfaces 114 and 118 to communicate to one another.

At a given moment, one management module 112 may be "active" in that it is actively functional and performing its functionality, while another management module 112 is in a "standby" mode and may become active in the event that the active management module 112 experiences a fault or failure that causes it to failover to the standby management module 112.

In addition to processor 103, memory 104, network interface 108, and management modules 112, information handling system 102 may include one or more other information handling resources.

FIGS. 2A-2C (which may be collectively referred to herein as "FIG. 2") illustrate a flow chart of an example method 200 for reliable firmware update of redundant management controllers in an information handling system, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, co-processor 116 of active management module 112 may communicate (e.g., via internal network 110) an updated firmware image for processor 113 to processor 113 of the active management module 112. At step 204, processor 113 of the active management module 112 may write the updated firmware image to a first reserve partition of memory 111 associated with processor 113 of the active management module 112. By writing to the first reserve partition of memory 111, as opposed to a first working partition of memory 111 associated with processor 113 of the active management module 112, processor 113 of the active management module 112 may remain bootable from the first working partition of memory 111 if the write to the first reserve partition of memory 111 fails.

At step 206, processor 113 of the active management module 112 may communicate (e.g., via internal network 110) the firmware image (e.g., that it received and stored in the first reserve partition of memory 111) to processor 113 of the standby management module 112. At step 208, processor 113 of the standby management module 112 may write the updated firmware image to a second reserve partition of memory 111 associated with processor 113 of the standby management module 112. By writing to the second reserve partition of memory 111, as opposed to a second working partition of memory 111 associated with processor 113 of the standby management module 112, processor 113 of the standby management module 112 may remain bootable from the second working partition of memory 111 if the write to the second reserve partition of memory 111 fails.

At step 210, processor 113 of the standby management module 112 may communicate (e.g., via internal network 110) to processor 113 of the active management module 112 that the firmware write to the second reserve partition of memory 111 associated with processor 113 of the standby management module 112 was successful. At step 212, processor 113 of the active management module 112 may communicate (e.g., via internal network 110) an indication to co-processor 116 of the active management module 112 that all firmware updates to the reserve partitions of memory 111 for processors 113 are complete.

At step 214, co-processor 116 of active management module 112 may receive an updated firmware image for co-processor 116 of the active management module 112. At step 216, co-processor 116 of the active management module 112 may write the updated firmware image to a third reserve partition of memory 111 associated with co-processor 116 of the active management module 112. By writing to the third reserve partition of memory 111, as opposed to a co-processor 116 of the active management module 112, co-processor 116 of the active management module 112 may remain bootable from the third working partition of memory 111 if the write to the third reserve partition of memory 111 fails.

At step 218, co-processor 116 of the active management module 112 may communicate (e.g., via internal network 110) the firmware image (e.g., that it received and stored in the third reserve partition of memory 111) to co-processor 116 of the standby management module 112. At step 220, co-processor 116 of the standby management module 112 may write the updated firmware image to a fourth reserve partition of memory 111 associated with co-processor 116 of the standby management module 112. By writing to the fourth reserve partition of memory 111, as opposed to a fourth working partition of memory 111 associated with co-processor 116 of the standby management module 112, co-processor 116 of the standby management module 112 may remain bootable from the fourth working partition of memory 111 if the write to the fourth reserve partition of memory 111 fails.

At step 222, co-processor 116 of the standby management module 112 may communicate (e.g., via internal network 110) to co-processor 116 of the active management module 112 that the firmware write to the fourth reserve portion of memory 111 associated with processor 113 of the standby management module 112 was successful. At this point in time, both processor 113 and co-processor 116 of both management modules 112 may have successfully written the updated firmware to the "B" partition. Also, processor 113 and co-processor 116 of both management modules 112 are still set to boot from their respective working partitions. So, any failure to write, a power failure, and/or any other failure that may occur in the foregoing steps may result in a system in which all processors of management modules 112 are still running code from the (working) "A" partition.

Accordingly, at step 224, co-processor 116 of the active management module 112 may communicate (e.g., via internal network 110) a message to processor 113 of the active management module 112 to boot processor 113 of the standby management module 112 into the second reserve partition associated with processor 113 of the standby management module 112. In response, at step 226, processor 113 of the standby management module 112 may update its boot table to boot into the second reserve partition associated with processor 113 of the standby management module 112. At step 228, processor 113 of the standby management module 112 may boot into the firmware image of the second reserve partition. At step 230, once processor 113 of the standby management module 112 has successfully booted into the firmware image of the second reserve partition, processor 113 of the standby management module 112 may communicate (e.g., via internal network 110) an indication to processor 113 of the active management module 112 that processor 113 of the standby management module 112 is executing the firmware of the second reserve partition. In turn, at step 232, processor 113 of the active management module 112 may communicate (e.g., via internal network 110) an indication to co-processor 116 of the active management module 112 that processor 113 of the standby management module 112 is executing the firmware of the second reserve partition.

At step 234, co-processor 116 of the active management module 112 may communicate (e.g., via internal network 110) a message to co-processor 116 of the standby management module 112 to boot co-processor 116 of the standby management module 112 into the fourth reserve partition associated with co-processor 116 of the standby management module 112. In response, at step 236, co-processor 116 of the standby management module 112 may update its boot table to boot into the fourth reserve partition associated with co-processor 116 of the standby management module 112. At step 238, co-processor 116 of the standby management module 112 may boot into the firmware image of the fourth reserve partition. At step 240, once co-processor 116 of the standby management module 112 has successfully booted into the firmware image of the fourth reserve partition, co-processor 116 of the standby management module 112 may communicate (e.g., via internal network 110) an indication to co-processor 116 of the active management module 112 that co-processor 116 of the standby management module 112 is executing the firmware of the fourth reserve partition.

At step 242, co-processor 116 of the active management module 112 may communicate (e.g., via internal network 110) a command to processor 113 of the active management module 112 to failover to processor 113 of the standby management module 112 and reboot. Thus, at step 244, processor 113 of the standby management module 112 may take over as active, and processor 113 of the active management module 112 may update its boot table to boot into the first reserve partition associated with processor 113 of the active management module 112.

At step 246, co-processor 116 of the active management module 112 may cause itself to failover to co-processor 116 of the standby management module 112 and reboot. Thus, at step 248, co-processor 116 of the standby management module 112 may take over as active, and co-processor 116 of the active management module 112 may update its boot table to boot into the third reserve partition associated with co-processor 113 of the active management module 112.

At step 250, processor 113 and co-processor 116 of the formerly active management module 112 become standby components.

The foregoing steps operate to ensure that the new version of firmware executes correctly on the respective processors 113 and co-processors 116 before booting into it. Of note, any failure in any of these steps may still result in a working system running the old firmware images, and such failure can be logged and a user can take corrective action (e.g., by re-starting the firmware update process, or, in the case of memory failure, the user can schedule a part replacement).

At step 252, once all of processors 113 and co-processors 116 are executing the updated firmware image, co-processor 116 of the formerly standby and now active management module 112 may signal to both processors 113 and co-processor 116 of the formerly active and now standby management module 112 to synchronize images of their respective reserve partitions (which are now working partitions) to their respective former working partitions, thus maintaining all relevant components with primary and secondary copies of the running firmware that are identical, and resilient to memory corruption. After completion of step 252, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information system handling 102 or any other system operable to implement method 200. In certain embodiments, method 200 may be implemented partially or fully in software and/or firmware embodied in computer-readable media.

For the purposes of clarity and exposition, the foregoing has discussed the methods and systems of a firmware update process with respect to two redundant management modules each having a processor and a co-processor. However, the firmware update procedures described herein may generally be applied to any processors and/or co-processors, regardless of whether such processors are integral to a management module or any other information handling system component.

In addition, the firmware update procedures described herein may be generally applied to any number of processors and/or co-processors, wherein such firmware update comprises:

1. Writing updated firmware images to reserve memory partitions associated with each node (wherein each "node" comprises a processor or co-processor;

2. If writing of an updated firmware image fails, roll all nodes back to the existing firmware images;

3. If writing of updated firmware images succeeds, booting each node into the updated firmware image stored on its associated reserve memory partition;

4. If booting of an updated firmware image fails, roll all nodes back to the existing firmware images; and 5. If booting of updated firmware images succeeds, copying the updated firmware images from reserve memory partitions associated with each node to the respective working memory partition associated with each node.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a first processor;
    a second processor;
    a first co-processor; and
    a second co-processor;
    wherein, the first processor, the second processor, the first co-processor, and the second co-processor are configured to, alone or in concert, perform a firmware update for the first processor, the second processor, the first co-processor, and the second co-processor by:
        writing an updated processor firmware image to a reserve memory partition associated with the first processor while the first processor is executing an existing processor firmware image stored in a working memory partition associated with the first processor;
        writing the updated processor firmware image to a reserve memory partition associated with the second processor while the second processor is executing the existing processor firmware image stored in a working memory partition associated with the second processor;
        writing an updated co-processor firmware image to a reserve memory partition associated with the first co-processor while the first co-processor is executing an existing co-processor firmware image stored in a working memory partition associated with the first co-processor;
        writing the updated co-processor firmware image to a reserve memory partition associated with the second co-processor while the second co-processor is executing the existing co-processor firmware image stored in a working memory partition associated with the second co-processor; and
    causing:
        the first processor to boot from the updated processor firmware image stored to the reserve memory partition associated with the first processor;
        the second processor to boot from the updated processor firmware image stored to the reserve memory partition associated with the second processor;
        the first co-processor to boot from the updated co-processor firmware image stored to the reserve memory partition associated with the first co-processor; and
        the second co-processor to boot from the updated co-processor firmware image stored to the reserve memory partition associated with the second co-processor.

2. The information handling system of claim 1, wherein:
    the first processor and the first co-processor are integral to a first management module configured to provide management of shared infrastructure of the information handling system; and
    the second processor and the second co-processor are integral to a second management module configured to provide management of shared infrastructure of the information handling system.

3. The information handling system of claim 1, wherein, prior to the writing of the updated processor firmware image and the updated co-processor image:
    the first processor operates as an active processor;
    the first co-processor operates as an active co-processor;
    the second processor operates as a standby processor to which the first processor is configured to failover in the event of a fault associated with the first processor; and
    the second co-processor operates as a standby co-processor to which the first co-processor is configured to failover in the event of a fault associated with the first co-processor.

4. The information handling system of claim 3, wherein the temporal order of writing comprises:
    writing the updated processor firmware image to the reserve memory partition associated with the first processor;
    writing the updated processor firmware image to the reserve memory partition associated with the second processor;
    writing the updated co-processor firmware image to the reserve memory partition associated with the first co-processor; and
    writing the updated co-processor firmware image to the reserve memory partition associated with the second co-processor.

5. The information handling system of claim 3, wherein the temporal order of booting comprises:
    booting the second processor;
    booting the second co-processor;
    booting the first processor; and
    booting the first co-processor.

6. The information handling system of claim 5, wherein:
    the first processor fails over to the second processor before booting of the first processor; and
    the first co-processor fails over to the second co-processor before booting.

7. The information handling system of claim 1, wherein the first processor, the second processor, the first co-processor, and the second co-processor are configured to, alone or in concert:
    copy the updated processor firmware image from the reserve memory partition associated with the first processor to the working memory partition associated with the first processor;
    copy the updated processor firmware image from the reserve memory partition associated with the second processor to the working memory partition associated with the second processor;
    copy the updated co-processor firmware image from the reserve memory partition associated with the first co-processor to the working memory partition associated with the first co-processor; and
    copy the updated co-processor firmware image from the reserve memory partition associated with the second co-processor to the working memory partition associated with the second co-processor.

8. The information handling system of claim 1, wherein the first processor, the second processor, the first co-processor, and the second co-processor are configured to, alone or in concert, in the event of failure of booting of the processor firmware image on the second processor or failure of booting of the updated co-processor firmware image on the second co-processor causing:
- execution by the first processor and the second processor of the existing processor firmware image;
- execution by the first co-processor and the second co-processor of the existing co-processor firmware image;
- copying of the existing processor firmware image from the working memory partition associated with the first processor to the reserve memory partition associated with the first processor;
- copying of the existing processor firmware image from the working memory partition associated with the second processor to the reserve memory partition associated with the second processor;
- copying of the existing co-processor firmware image from the working memory partition associated with the first co-processor to the reserve memory partition associated with the first co-processor; and
- copying of the existing co-processor firmware image from the working memory partition associated with the second co-processor to the reserve memory partition associated with the second co-processor.

9. A method for, in an information handling system comprising a first processor, a second processor, a first co-processor, and a second co-processor, performing a firmware update for the first processor, the second processor, the first co-processor, and the second co-processor by:
- writing an updated processor firmware image to a reserve memory partition associated with the first processor while the first processor is executing an existing processor firmware image stored in a working memory partition associated with the first processor;
- writing the updated processor firmware image to a reserve memory partition associated with the second processor while the second processor is executing the existing processor firmware image stored in a working memory partition associated with the second processor;
- writing an updated co-processor firmware image to a reserve memory partition associated with the first co-processor while the first co-processor is executing an existing co-processor firmware image stored in a working memory partition associated with the first co-processor;
- writing the updated co-processor firmware image to a reserve memory partition associated with the second co-processor while the second co-processor is executing the existing co-processor firmware image stored in a working memory partition associated with the second co-processor; and
- causing:
  - the first processor to boot from the updated processor firmware image stored to the reserve memory partition associated with the first processor;
  - the second processor to boot from the updated processor firmware image stored to the reserve memory partition associated with the second processor;
  - the first co-processor to boot from the updated co-processor firmware image stored to the reserve memory partition associated with the first co-processor; and
  - the second co-processor to boot from the updated co-processor firmware image stored to the reserve memory partition associated with the second co-processor.

10. The method of claim 9, wherein:
- the first processor and the first co-processor are integral to a first management module configured to provide management of shared infrastructure of the information handling system; and
- the second processor and the second co-processor are integral to a second management module configured to provide management of shared infrastructure of the information handling system.

11. The method of claim 9, wherein, prior to the writing of the updated processor firmware image and the updated co-processor image:
- the first processor operates as an active processor;
- the first co-processor operates as an active co-processor;
- the second processor operates as a standby processor to which the first processor is configured to failover in the event of a fault associated with the first processor; and
- the second co-processor operates as a standby co-processor to which the first co-processor is configured to failover in the event of a fault associated with the first co-processor.

12. The method of claim 11, wherein the temporal order of writing comprises:
- writing the updated processor firmware image to the reserve memory partition associated with the first processor;
- writing the updated processor firmware image to the reserve memory partition associated with the second processor;
- writing the updated co-processor firmware image to the reserve memory partition associated with the first co-processor; and
- writing the updated co-processor firmware image to the reserve memory partition associated with the second co-processor.

13. The method of claim 11, wherein the temporal order of booting comprises:
- booting the second processor;
- booting the second co-processor;
- booting the first processor; and
- booting the first co-processor.

14. The method of claim 13, wherein:
- the first processor fails over to the second processor before booting of the first processor; and
- the first co-processor fails over to the second co-processor before booting.

15. The method of claim 9, further comprising:
- copying the updated processor firmware image from the reserve memory partition associated with the first processor to the working memory partition associated with the first processor;
- copying the updated processor firmware image from the reserve memory partition associated with the second processor to the working memory partition associated with the second processor;
- copying the updated co-processor firmware image from the reserve memory partition associated with the first co-processor to the working memory partition associated with the first co-processor; and
- copying the updated co-processor firmware image from the reserve memory partition associated with the second co-processor to the working memory partition associated with the second co-processor.

16. The method of claim 9, further comprising causing:
execution by the first processor and the second processor of the existing processor firmware image;
execution by the first co-processor and the second co-processor of the existing co-processor firmware image;
copying of the existing processor firmware image from the working memory partition associated with the first processor to the reserve memory partition associated with the first processor;
copying of the existing processor firmware image from the working memory partition associated with the second processor to the reserve memory partition associated with the second processor;
copying of the existing co-processor firmware image from the working memory partition associated with the first co-processor to the reserve memory partition associated with the first co-processor; and
copying of the existing co-processor firmware image from the working memory partition associated with the second co-processor to the reserve memory partition associated with the second co-processor.

17. An article of manufacture comprising:
a non-transitory computer-readable medium; and
computer-executable instructions carried on the computer-readable medium, the instructions readable by a processor, the instructions, when read and executed, for causing the processor to, in an information handling system comprising a first processor, a second processor, a first co-processor, and a second co-processor, perform a firmware update for the first processor, the second processor, the first co-processor, and the second co-processor by:
writing an updated processor firmware image to a reserve memory partition associated with the first processor while the first processor is executing an existing processor firmware image stored in a working memory partition associated with the first processor;
writing the updated processor firmware image to a reserve memory partition associated with the second processor while the second processor is executing the existing processor firmware image stored in a working memory partition associated with the second processor;
writing an updated co-processor firmware image to a reserve memory partition associated with the first co-processor while the first co-processor is executing an existing co-processor firmware image stored in a working memory partition associated with the first co-processor;
writing the updated co-processor firmware image to a reserve memory partition associated with the second co-processor while the second co-processor is executing the existing co-processor firmware image stored in a working memory partition associated with the second co-processor; and
causing:
the first processor to boot from the updated processor firmware image stored to the reserve memory partition associated with the first processor;
the second processor to boot from the updated processor firmware image stored to the reserve memory partition associated with the second processor;
the first co-processor to boot from the updated co-processor firmware image stored to the reserve memory partition associated with the first co-processor; and
the second co-processor to boot from the updated co-processor firmware image stored to the reserve memory partition associated with the second co-processor.

18. The article of claim 17, wherein:
the first processor and the first co-processor are integral to a first management module configured to provide management of shared infrastructure of the information handling system; and
the second processor and the second co-processor are integral to a second management module configured to provide management of shared infrastructure of the information handling system.

19. The article of claim 18, wherein, prior to the writing of the updated processor firmware image and the updated co-processor image:
the first processor operates as an active processor;
the first co-processor operates as an active co-processor;
the second processor operates as a standby processor to which the first processor is configured to failover in the event of a fault associated with the first processor; and
the second co-processor operates as a standby co-processor to which the first co-processor is configured to failover in the event of a fault associated with the first co-processor.

20. The article of claim 19, wherein the temporal order of writing comprises:
writing the updated processor firmware image to the reserve memory partition associated with the first processor;
writing the updated processor firmware image to the reserve memory partition associated with the second processor;
writing the updated co-processor firmware image to the reserve memory partition associated with the first co-processor; and
writing the updated co-processor firmware image to the reserve memory partition associated with the second co-processor.

21. The article of claim 19, wherein the temporal order of booting comprises:
booting the second processor;
booting the second co-processor;
booting the first processor; and
booting the first co-processor.

22. The article of claim 21, wherein:
the first processor fails over to the second processor before booting of the first processor; and
the first co-processor fails over to the second co-processor before booting.

23. The article of claim 17, the instructions for further causing the processor to:
copying the updated processor firmware image from the reserve memory partition associated with the first processor to the working memory partition associated with the first processor;
copying the updated processor firmware image from the reserve memory partition associated with the second processor to the working memory partition associated with the second processor;
copying the updated co-processor firmware image from the reserve memory partition associated with the first co-processor to the working memory partition associated with the first co-processor; and copying the updated co-processor firmware image from the reserve memory partition associated with the second co-processor to the working memory partition associated with the second co-processor.

24. The method of claim 17, the instructions for further causing the processor to cause:

execution by the first processor and the second processor of the existing processor firmware image;

execution by the first co-processor and the second co-processor of the existing co-processor firmware image;

copying of the existing processor firmware image from the working memory partition associated with the first processor to the reserve memory partition associated with the first processor;

copying of the existing processor firmware image from the working memory partition associated with the second processor to the reserve memory partition associated with the second processor;

copying of the existing co-processor firmware image from the working memory partition associated with the first co-processor to the reserve memory partition associated with the first co-processor; and copying of the existing co-processor firmware image from the working memory partition associated with the second co-processor to the reserve memory partition associated with the second co-processor.

\* \* \* \* \*